United States Patent
Natter et al.

(10) Patent No.: US 9,899,821 B2
(45) Date of Patent: Feb. 20, 2018

(54) CORDSET ASSEMBLY

(71) Applicant: Lear Corporation, Southfield, MI (US)

(72) Inventors: Brantley Natter, Brighton, MI (US); Arthur Lawrence Richards, Livonia, MI (US); Faisal K. Sallam, Dearborn, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/621,441

(22) Filed: Feb. 13, 2015

(65) Prior Publication Data

US 2015/0372469 A1    Dec. 24, 2015

Related U.S. Application Data

(60) Provisional application No. 62/016,238, filed on Jun. 24, 2014.

(51) Int. Cl.
*H02G 3/22*      (2006.01)
*H02G 15/013*    (2006.01)
*H02G 3/08*      (2006.01)

(52) U.S. Cl.
CPC ............. *H02G 3/22* (2013.01); *H02G 3/088* (2013.01); *H02G 15/013* (2013.01)

(58) Field of Classification Search
CPC ...... H02G 3/22; H02G 3/0616; H02G 3/0625; H02G 3/0641; H02G 3/065; H02G 3/0658; H02G 15/013; F16L 5/02; H05K 5/069
USPC ....... 174/659, 650, 652, 665, 68, 262, 70 R, 174/73.1, 74 R, 75 R, 75 B, 77 R; 277/602–627; 439/449–473
See application file for complete search history.

(56) References Cited

U.S. PATENT DOCUMENTS

| | | | |
|---|---|---|---|
| 3,058,762 A * | 10/1962 | Howe .................. | F16L 19/086 285/340 |
| 3,744,008 A * | 7/1973 | Castellani ............ | H02G 3/0658 174/652 |
| 4,150,250 A * | 4/1979 | Lundeberg ............. | H02G 3/065 174/655 |
| 4,490,576 A * | 12/1984 | Bolante ................ | H02G 3/0616 174/655 |
| 4,513,172 A * | 4/1985 | Matsui ................. | H02G 15/04 174/653 |
| 4,549,038 A * | 10/1985 | Masheris ............. | H02G 3/065 174/653 |

(Continued)

FOREIGN PATENT DOCUMENTS

| | | |
|---|---|---|
| DE | 202010016711 U1 | 3/2012 |
| DE | 202011002286 U1 | 5/2012 |

OTHER PUBLICATIONS

SAE International, Surface Vehicle Recommended Practice, SAE Electric Vehicle and Plug In Hybrid Electric Vehicle Conductive Charge Coupler, J1772, Rev. Proposed Draft Aug. 2009.

(Continued)

*Primary Examiner* — Dimary Lopez Cruz
(74) *Attorney, Agent, or Firm* — Brooks Kushman P.C.

(57) ABSTRACT

A cordset assembly that may have an electrical device and at least one cord. A clamp may be disposed on the cord and may be received in a cord hole that may be at least partially defined by a mounting boss. A seal assembly may be disposed in the cord hole between the clamp and a cap. The cap, seal assembly, and clamp may cooperate to secure the cord.

20 Claims, 3 Drawing Sheets

(56) References Cited

U.S. PATENT DOCUMENTS

| | | | |
|---|---|---|---|
| 4,669,791 A | 6/1987 | Savill | |
| 4,692,562 A * | 9/1987 | Nattel | H02G 15/013 |
| | | | 174/653 |
| 4,707,046 A | 11/1987 | Strand | |
| 4,885,429 A * | 12/1989 | Schnittker | H02G 3/0691 |
| | | | 174/668 |
| 5,080,600 A | 1/1992 | Baker et al. | |
| 5,344,330 A | 9/1994 | Hoffman | |
| 5,344,331 A | 9/1994 | Hoffman et al. | |
| 5,346,406 A | 9/1994 | Hoffman et al. | |
| 5,385,480 A | 1/1995 | Hoffman | |
| 5,478,250 A | 12/1995 | Hoffman | |
| 5,567,174 A * | 10/1996 | Ericson, Jr. | H01R 13/5205 |
| | | | 439/462 |
| 5,575,675 A | 11/1996 | Endo et al. | |
| 5,664,960 A | 9/1997 | Fukushima | |
| 5,674,086 A | 10/1997 | Hashizawa et al. | |
| 5,676,560 A | 10/1997 | Endo et al. | |
| 5,751,135 A | 5/1998 | Fukushima et al. | |
| 5,816,643 A | 10/1998 | Itou et al. | |
| 5,866,853 A | 2/1999 | Sheehan | |
| 5,873,737 A | 2/1999 | Hashizawa et al. | |
| 5,906,500 A | 5/1999 | Kakuta et al. | |
| 6,203,354 B1 | 3/2001 | Kuwahara et al. | |
| 6,450,550 B1 * | 9/2002 | Cornwell | F16L 19/0283 |
| | | | 285/340 |
| 6,511,341 B1 | 1/2003 | Finona et al. | |
| 7,052,282 B2 | 5/2006 | Meleck et al. | |
| 7,878,866 B1 | 2/2011 | Kwasny et al. | |
| 8,016,607 B2 | 9/2011 | Brown, II | |
| 8,657,626 B2 * | 2/2014 | Duval | H01R 13/5205 |
| | | | 439/583 |
| 8,819,893 B2 * | 9/2014 | Shishido | F16L 5/02 |
| | | | 16/2.2 |
| 2011/0070758 A1 | 3/2011 | Poulin et al. | |
| 2014/0077109 A1 | 3/2014 | Poulin | |

OTHER PUBLICATIONS

German Patent and Trademark Office, Office Action for the corresponding German Patent Application No. 10 2015 211 423.6 dated Apr. 4, 2016.

The State Intellectual Property Office, Chinese Office Action for the corresponding Chinese Patent Application No. 201510349495.3 dated Mar. 31, 2017.

* cited by examiner

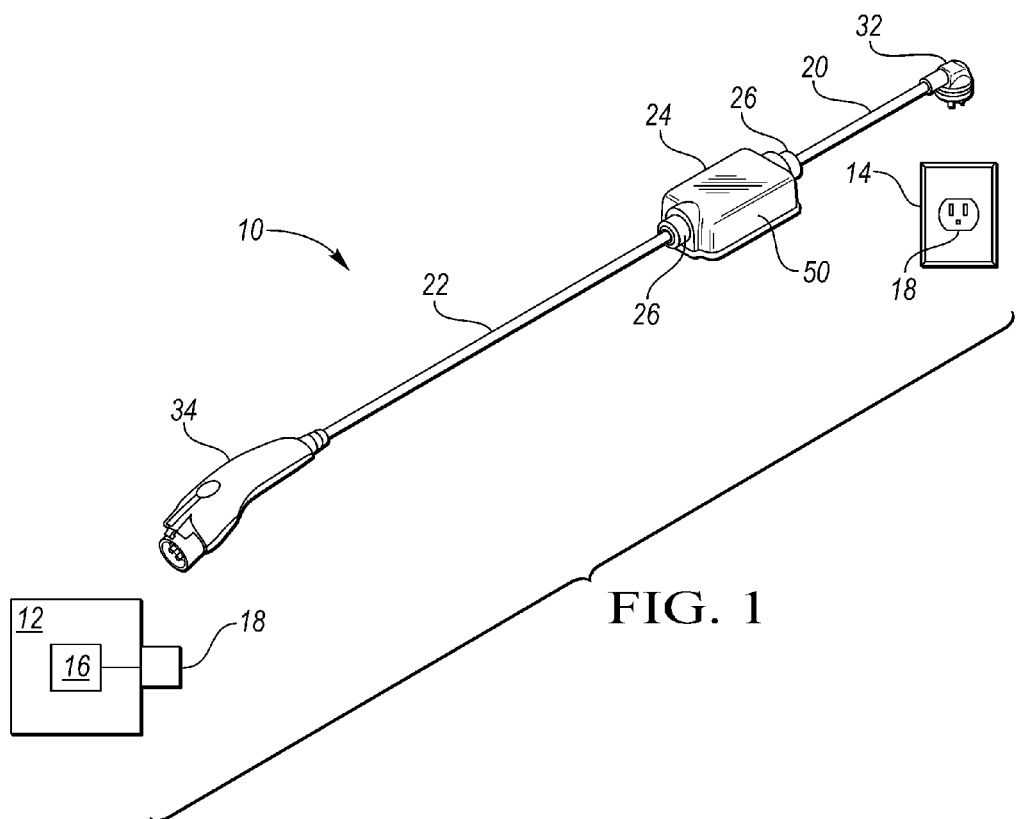
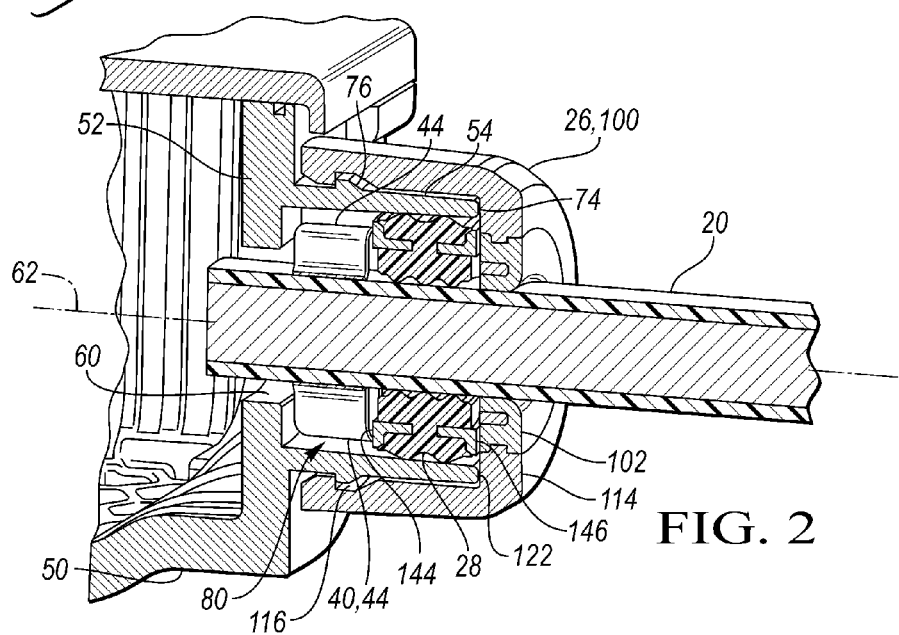

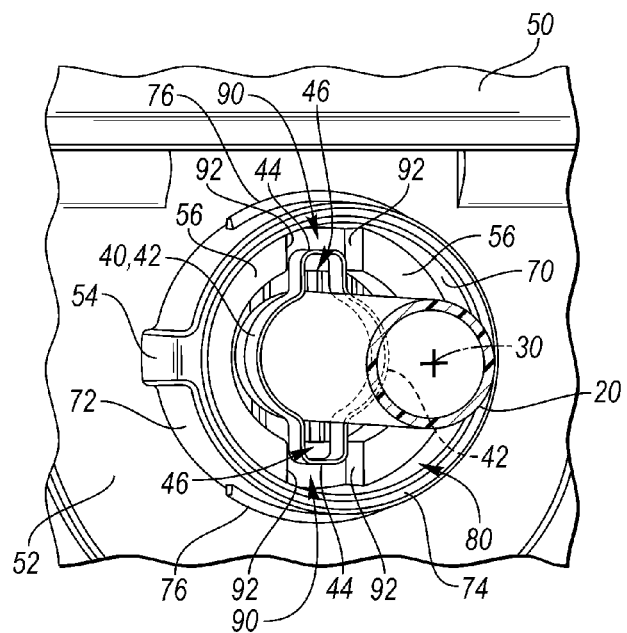
FIG. 3
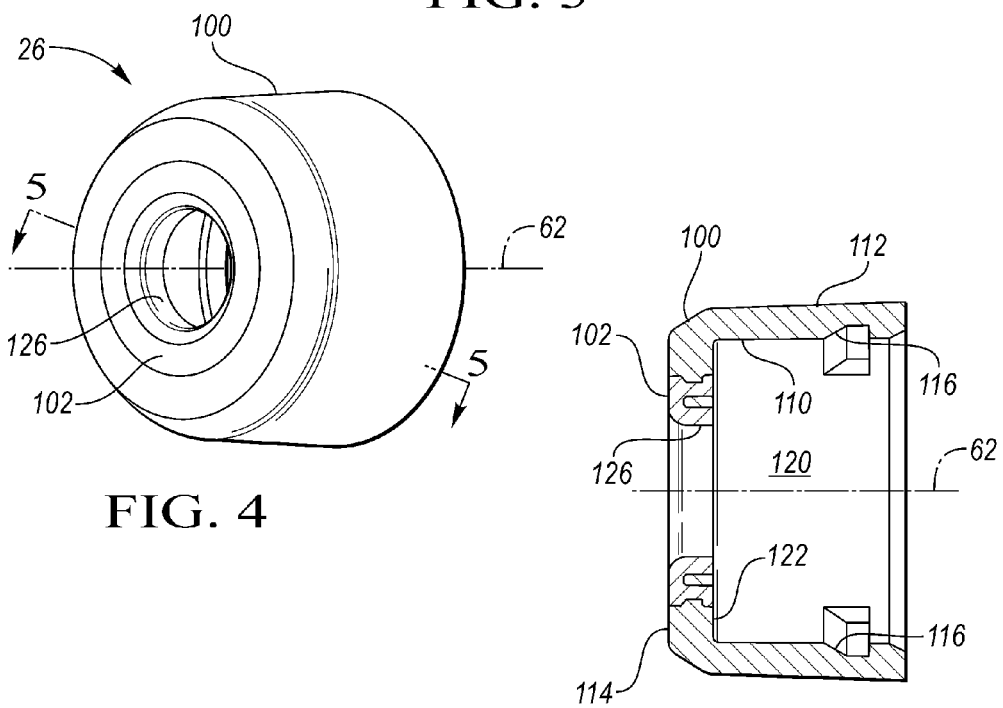
FIG. 4
FIG. 5

CORDSET ASSEMBLY

CROSS-REFERENCE TO RELATED APPLICATIONS

This application claims the benefit of U.S. Provisional Application Ser. No. 62/016,238, filed Jun. 24, 2014, the disclosure of which is hereby incorporated in its entirety by reference herein.

TECHNICAL FIELD

This patent application relates to a cordset assembly that may provide electrical energy to a vehicle.

BACKGROUND

A cordset assembly for a vehicle is disclosed in U.S. Patent Publication No. 2014/0077019, which is assigned to Lear Corporation.

SUMMARY

In at least one embodiment, a cordset assembly is provided. The cordset assembly may include an electrical device, a cap, a cord, a clamp, and a seal assembly. The electrical device may have a housing. The housing may have a mounting boss that may at least partially define a cord hole. The cap may be disposed on the mounting boss. The cord may extend through the cord hole and the cap. The clamp may be disposed on the cord and may be received in the cord hole. The seal assembly may be disposed in the cord hole between the clamp and the cap. The cap, seal assembly, and clamp may cooperate to secure the cord to the housing.

In at least one embodiment, a cordset assembly is provided. The cordset assembly may include an electrical device, a cap, a cord, a clamp, and a seal assembly. The electrical device may have a housing that may include a housing wall, a mounting boss, and first and second clamp engagement features. The housing wall may have a cord opening. The mounting boss may extend from the housing wall and may at least partially define a cord hole. The first and second clamp engagement features may be disposed in the cord hole and may cooperate to define a first slot. The cap may receive the mounting boss. The cord may extend through the cord opening and the cord hole. A clamp may be fixedly disposed on the cord and may be received in the first slot. The seal assembly may be disposed in the cord hole between the clamp and the cap. The clamp may be disposed between the housing wall and the seal assembly. The cap, seal assembly, and clamp may cooperate to inhibit movement of the cord.

BRIEF DESCRIPTION OF THE DRAWINGS

FIG. 1 is a perspective view of an exemplary cordset assembly.

FIG. 2 is a section view of a portion of the cordset assembly.

FIG. 3 is a perspective view of the cordset assembly with a cap and seal assembly removed.

FIG. 4 is a perspective view of a cap.

FIG. 5 is a section view of the cap along section line 5-5.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 7:
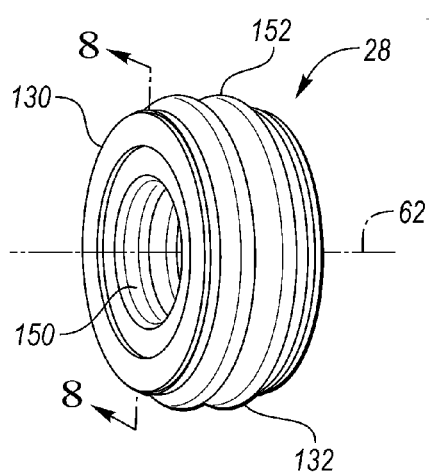
FIG. 7 is a perspective view of the seal assembly.

Referring to FIG. 1, an exemplary cordset assembly 10 is shown. The cordset assembly 10 may facilitate charging of an electrical power source of a vehicle 12, such as an electric or hybrid electric vehicle. For example, the cordset assembly 10 may electrically couple an external power source 14 that is remote from the vehicle to a vehicle electrical power source 16, such as a battery. The external power source 14 and the vehicle electrical power source 16 may each have an electrical outlet 18 or may be electrically connected to an associated electrical outlet to provide electrical connections with the cordset assembly 10. The electrical outlets 18 associated with the external power source 14 and the vehicle electrical power source 16 may have different configurations. In at least one embodiment, the cordset assembly 10 may include a first cord 20, a second cord 22, an electrical device 24, a cap 26, and a seal assembly 28, which is best shown in FIGS. 2 and 7.

The first and second cords 20, 22 may extend from the same side or different sides of the electrical device 24. For example, the first and second cords 20, 22 may extend from first and second ends of the electrical device 24 that may be disposed opposite each other. The first and second cords 20, 22 may be electrically conductive flexible power cords that may each include a plurality of conductors that may be disposed inside an insulator or outer cover that may define an exterior surface of the first and second cords 20, 22. Each cord 20, 22 may extend along a cord axis 30 as is best shown in FIG. 3.

The first and second cords 20, 22 may each have an electrical terminal or plug at a free end. For instance, the first cord 20 may have a first electrical terminal 32 or plug that may be configured to engage and mate with a corresponding electrical outlet 18 that may be electrically connected to the external power source 14. The second cord 22 may have a second electrical terminal 34 or plug that may be configured to engage and mate with a corresponding electrical outlet 18 on the vehicle 12.

Referring to FIGS. 2 and 3, a clamp 40 may be provided with the first cord 20 and the second cord 22. In FIGS. 2 and 3, the cord is labeled as the first cord 20, but the same configuration may apply to the second cord 22. As such, the first and second cords 20, 22 may be referred to together or interchangeably below. The clamp 40 may be made of any suitable material, such as a metal alloy like steel. The clamp 40 may be fixedly positioned on a corresponding cord 20, 22 such that the clamp 40 remains stationary with respect to the cord 20, 22. For example, the clamp 40 may be disposed on an exterior surface of the cord 20, 22, such as the outside circumference of the insulator. The clamp 40 may extend partially or completely around an exterior surface of a cord 20, 22 and may include one or more band portions 42 and one or more retention portions 44.

The band portion 42 may be configured to engage an exterior surface of the cord 20, 22. In FIG. 3, two band portions 42 are shown, although it is contemplated that a greater or lesser number of band portions 42 may be provided. The band portions 42 may each extend along an arc and may be disposed generally opposite each other.

The retention portion 44 may be configured to engage a portion of the electrical device 24 as will be discussed in more detail below. In FIGS. 2 and 3, two retention portions 44 are shown, although it is contemplated that a greater or lesser number of retention portions 44 may be provided. The retention portions 44 may be generally disposed opposite each other and may extend from one or more band portions 42. For example, each retention portion 44 may extend at least partially around the cord 20, 22 and may extend from a band portion 42 or may extend between or may interconnect two different band portions 42. The retention portion 44 may extend outwardly from the exterior surface of the cord 20, 22 and may be disposed at a greater distance from the cord axis 30 or the exterior surface of the cord 20, 22 than the band portion 42. The retention portion 44 may be spaced apart from the cord 20, 22 such that a gap 46 may be provided between a retention portion 44 and the exterior surface of the cord 20, 22.

The electrical device 24 may facilitate the transmission of power or current. For example, the electrical device 24 may be a charge controller interruption device (CCID) that may monitor and/or control the flow of electrical power from the external power source 14 to the vehicle 12. For example, the charge controller interruption device may be configured to enable or disable the flow of electrical power to the vehicle 12. In at least one embodiment, the charge controller interruption device may disable the flow of electricity to the vehicle 12 when an error or fault condition is detected. Error or fault conditions may include, but may not be limited to improper connections to the external power source 14 and/or vehicle electrical power source 16, ground faults, overheating, and the like. In at least one embodiment, the electrical device 24 may include a housing 50.

Referring to FIGS. 1 and 2, the housing 50 may contain electrical circuitry and components of the electrical device 24. As such, the housing 50 may help protect and/or electrically insulate the components of the electrical device 24. The housing 50 may be made of any suitable material, such as a polymeric material like polycarbonate.

Referring to FIGS. 2 and 3, the housing 50 may include one or more panels or housing walls 52, at least one mounting boss 54, and one or more clamp engagement features 56.

The housing walls 52 may form at least a portion of the exterior of the housing 50. The housing walls 52 may be integrally formed, vibration welded, bonded, or joined together in any suitable manner. As is best shown in FIG. 2, at least one housing wall 52 may include a cord opening 60 through which a cord 20, 22 may extend. The cord opening 60 may be configured as a through hole that may extend to the inside of the housing 50. The cord opening 60 may extend along and may be radially disposed with respect to an axis 62. The axis 62 may be coaxially disposed with respect to at least a portion of the cord 20, 22 or a portion of the cord axis 30 that extends through the cord opening 60. Different cord openings 60 may be provided to receive the first cord 20 and the second cord 22. For example, the first cord 20 and the second cord 22 may extend through the corresponding cord openings 60 that may be disposed at opposite ends of the housing 50.

The mounting boss 54 may extend from a housing wall 52 and may be disposed proximate the cord opening 60. For example, the mounting boss 54 may extend continuously around the cord opening 60 and/or the axis 62 in a ring-like manner and may protrude outwardly from an exterior surface of a housing wall 52. The mounting boss 54 may extend substantially perpendicular to the housing wall 52 in one or more embodiments. In at least one embodiment, the mounting boss 54 may include an interior surface 70, an exterior surface 72, a mounting boss end surface 74, and a cap retention feature 76.

The interior surface 70 may face toward the cord 20, 22. In at least one embodiment, the interior surface 70 may define at least a portion of an inside circumference of the mounting boss 54 and may be radially disposed with respect to the axis 62. The interior surface 70 may at least partially define a cord hole 80 through which the cord 20, 22 may extend. The cord hole 80 may be disposed adjacent to the cord opening 60 and may extend further from the axis 62 or may have a larger diameter than the cord opening 60 in one or more embodiments.

The exterior surface 72 may be disposed opposite the interior surface 70. As such, the exterior surface 72 may define at least a portion of an outer surface or outside circumference of the mounting boss 54 and may be radially disposed with respect to the axis 62.

The mounting boss end surface 74 may extend from the interior surface 70 to the exterior surface 72. The mounting boss end surface 74 may be disposed at an end of the mounting boss 54 that may be disposed opposite the housing wall 52 from which it extends. In at least one embodiment, the cord hole 80 may extend from the cord opening 60 to the mounting boss end surface 74.

The cap retention feature 76 may be configured to engage the cap 26 to inhibit axial movement of the cap 26 in one or more directions, such as away from the housing 50. One or more cap retention features 66 may be provided with the mounting boss 54. In the embodiment shown in FIGS. 2 and 3, two cap retention features 66 are provided that have a male configuration and that extend outwardly from an exterior surface 72 of the mounting boss 54 and away from the axis 62; however, it is contemplated that a greater or lesser number of cap retention features 66 may be provided in one or more embodiments. In addition, it is also contemplated that the cap retention feature 76 may have a female configuration and/or that the cap retention feature 76 may be provided on another surface of the mounting boss 54 such as the mounting boss end surface 74.

One or more clamp engagement features 56 may be configured to engage the clamp 40 to limit or inhibit rotation of the clamp 40 and a corresponding cord 20, 22 in one or more directions, such as in a clockwise and/or counterclockwise direction with respect to a cord axis 30 and/or axis 62. In the embodiment shown in FIGS. 2 and 3, two clamp engagement features 56 are provided that are spaced apart from each other and disposed inside the mounting boss 54. The clamp engagement features 56 may be disposed in the cord hole 80 and may extend from the housing wall 52 and/or the mounting boss 54. For example, the clamp engagement features 56 may extend from the housing wall 52 toward the seal assembly 28 and/or from the interior surface 70 of the mounting boss 54 toward the cord 20, 22 and the axis 62. The clamp engagement features 56 may be integrally formed with the housing 50. In addition one or more clamp engagement features 56 may be spaced apart from and may not engage the cord 20, 22.

The clamp engagement features 56 may cooperate to define at least one slot 90. In the embodiment shown in FIGS. 2 and 3, two slots 90 are provided; however, it is also contemplated that a greater or lesser number of slots 90 may be provided depending on the configuration of the clamp 40 or the number of retention portions 44 provided with the clamp 40. Each slot 90 may be at least partially defined by an end surface 92 that may be associated with one or more clamp engagement features 56. For example, a slot 90 may be partially defined by a pair of end surfaces 92 that may be disposed opposite and spaced apart from each other. An end surface 92 may extend from the interior surface 70 toward or to the cord opening 60 in one or more embodiments. In addition, a slot 90 may also be partially defined by the housing wall 52. For instance, the housing wall 52 may extend between opposing end surfaces 92 and may be configured to engage the clamp 40 as will be discussed in more detail below.

As is best shown in FIG. 3, a slot 90 may be configured to receive a retention portion 44 of the clamp 40. The clamp 40 and associated cord 20, 22 upon which the clamp 40 is mounted may be inhibited from rotating about the cord axis 30 when the retention portion 44 of the clamp 40 engages an end surface 92 of a clamp engagement feature 56. As such, the clamp 40 may cooperate with one or more clamp engagement features 56 to help inhibit rotation or twisting of a cord 20, 22 that may lead to the disengagement of one or more wires or conductors of the cord 20, 22 from an electrical component or circuitry of the electrical device 24. The slot 90 may be configured such that a slot 90 may permit a small amount of rotation in one or more embodiments. The clamp 40 may also be configured to engage the housing wall 52 to inhibit axial movement of the clamp 40 and a corresponding cord 20, 22 toward the inside of the housing 50. In one or more embodiments, the clamp 40 may be spaced apart from and may not engage the mounting boss 54 when disposed in the slot 90. The band portion 42 of the clamp 40 may not be received in the slot 90 in one or more embodiments.

Referring to FIGS. 2 and 4-6, the cap 26 is configured to secure a corresponding cord 20, 22 to the housing 50. In at least one embodiment, the cap 26 may include a body 100 and a grommet 102.

Figure 6:
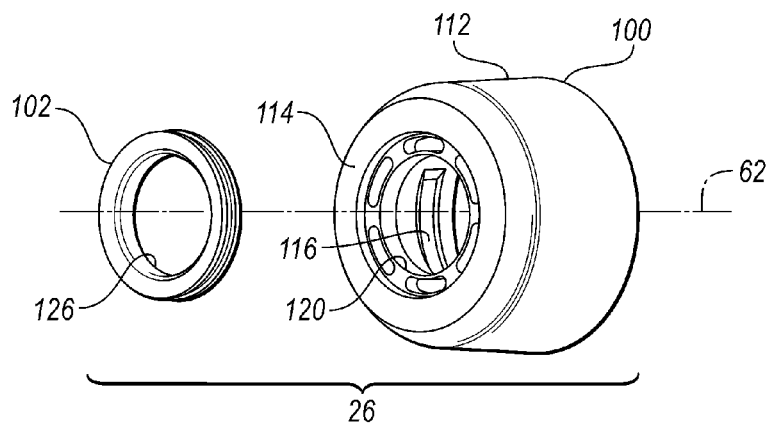
FIG. 6 is an exploded view of the cap.

The body 100 may be disposed on the mounting boss 54 and may be configured to receive the mounting boss 54. For example, the body 100 may extend continuously around the mounting boss 54 in one or more embodiments. As is best shown in FIGS. 5 and 6, the body 100 may include an interior body surface 110, an exterior body surface 112, a body end portion 114, and a retention feature 116.

The interior body surface 110 may face toward and may extend around the exterior surface 72 of the mounting boss 54. In at least one embodiment, the interior body surface 110 may define at least a portion of an inside circumference of the cap 26 and may be radially disposed with respect to the axis 62.

The exterior body surface 112 may be disposed opposite the interior body surface 110. As such, the exterior body surface 112 may define at least a portion of an outer surface or outside circumference of the cap 26.

The body end portion 114 may be disposed at an end of the cap 26 that may be disposed opposite the housing wall 52. The body end portion 114 may extend toward the axis 62 and may define a body hole 120 that may receive the grommet 102. The body end portion 114 may have a body end surface 122 may extend from the interior body surface 110 to the grommet 102. The body end surface 122 may extend substantially perpendicular with respect to the axis 62 in one or more embodiments. As is best shown in FIG. 2, the body end surface 122 may be disposed proximate and may engage the mounting boss end surface 74. The body end portion 114 may also include a plurality of openings that may facilitate installation or overmolding of the grommet 102 onto the body 100.

The retention feature 116 may be configured to engage the mounting boss 54 to help secure the cap 26 to the mounting boss 54 and inhibit movement of the cap 26 in one or more directions, such as away from the housing 50. For example, the retention feature 116 may engage or mate with a corresponding cap retention feature 76 of the mounting boss 54. One or more retention features 116 may be provided with the cap 26. In the embodiment shown in FIGS. 2 and 3, two cap retention features 66 are provided that have a female configuration that are configured to receive a cap retention feature 76 and that may extend outward from the interior body surface 110 toward the exterior body surface 112; however, it is contemplated that a greater or lesser number of retention features 116 may be provided in one or more embodiments. In addition, it is also contemplated that the retention feature 116 may have a male configuration and/or that the retention feature 116 may be provided on another surface of the cap 26, such as the body end portion 114.

The cap 26 may be installed by positioning the mounting boss 54 inside the cap 26 and then pushing the cap 26 over the mounting boss 54 such that the retention feature 116 slides over the cap retention feature 76 and locks against the cap retention feature 76 to inhibit removal of the cap 26 or inhibit axial movement of the cap 26 away from the housing 50. Optionally or in addition, the body 100 may engage the housing wall 52 and/or the mounting boss end surface 74 to inhibit axial movement of the cap 26 toward the housing 50.

Referring to FIGS. 4 and 5, the grommet 102 may be integrally formed with the body 100. The grommet 102 may help limit bending or flexing of an associated cord 20, 22 to help inhibit damage to one or more wires of an associated cord 20, 22. The grommet 102 may be disposed in the body hole 120 between the body 100 and an associated cord 20, 22 and may extend continuously around an associated cord 20, 22. As such, the grommet 102 may separate the body 100 from the cord 20, 22. In addition, the grommet 102 may be disposed proximate the cord hole 80 and may be disposed proximate and may engage the seal assembly 28. The grommet 102 may be made of any suitable material, such as an elastomeric material. The grommet 102 may have a grommet hole 126 through which the cord 20, 22 may extend.

Referring to FIGS. 2 and 7-9, the seal assembly 28 is shown in more detail. The seal assembly 28 may help limit or inhibit movement of an associated cord 20, 22, with respect to the housing 50 as will be discussed in more detail below. As is best shown in FIG. 2, the seal assembly 28 may extend around an associated cord 20, 22 and may be disposed between the clamp 40 and the body end portion 114 of the cap 26. In at least one embodiment, the seal assembly 28 may include a seal tube 130 and a seal 132.

Figure 8:
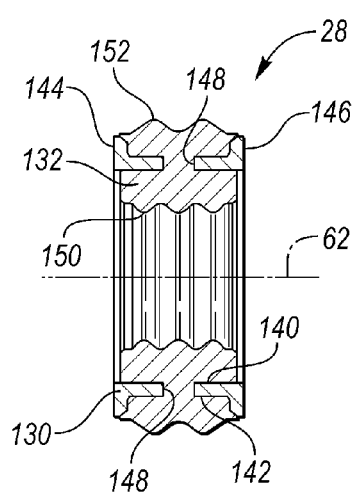
FIG. 8 is a section view of the seal assembly along section line 8-8.
Figure 9:
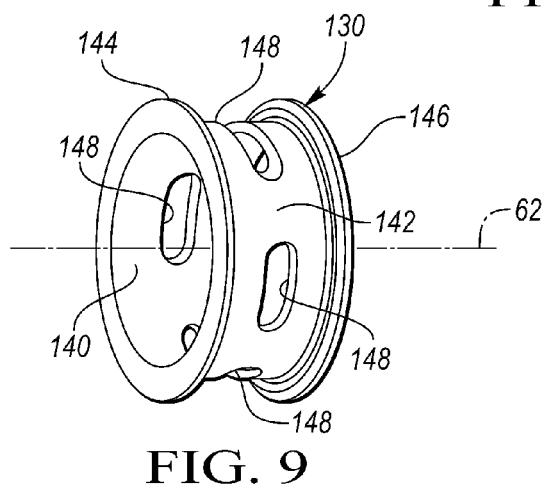
FIG. 9 is a perspective view of a seal tube of the seal assembly.

Referring to FIGS. 7-9, the seal tube 130 may be configured to extend around an associated cord 20, 22 and may support the seal 132. The seal tube 130 may be made of any suitable material, such as a polymeric material like nylon. In at least one embodiment, the seal tube 130 may have an inner seal tube surface 140, an outer seal tube surface 142, a first seal tube side wall 144, and a second seal tube side wall 146.

The inner seal tube surface 140 may face toward and may be spaced apart from an associated cord 20, 22. In at least one embodiment, the inner seal tube surface 140 may define at least a portion of an inside circumference of the seal tube 130 and may be radially disposed with respect to the axis 62.

The outer seal tube surface 142 may be disposed opposite the inner seal tube surface 140. As such, the outer seal tube surface 142 may define at least a portion of an outer surface or outside circumference of the seal tube 130. A plurality of seal tube openings 148 may extend from the inner seal tube surface 140 to the outer seal tube surface 142 to facilitate installation or overmolding of the seal 132 onto the seal tube 130.

The first seal tube side wall 144 may form at least a portion of a side of the seal assembly 28 that faces toward the clamp 40. For example, the first seal tube side wall 144 may be disposed proximate an end of the seal tube 130 that is disposed adjacent to the clamp 40. The first seal tube side wall 144 may be disposed proximate and may engage the clamp engagement features 56 of the housing 50 and/or one or more retention portions 44 of the clamp 40 to help hold the clamp 40 in a corresponding slot 90. The first seal tube side wall 144 may extend away from the cord 20, 22 and toward the mounting boss 54 such that the first seal tube side wall 144 protrudes past the outer seal tube surface 142 to help retain the seal 132 and inhibit axial movement of the seal 132 with respect to the seal tube 130.

The second seal tube side wall 146 may be disposed opposite the first seal tube side wall 144. As such, the second seal tube side wall 146 may face toward and may engage the body end portion 114 of the cap 26 and/or the grommet 102. The second seal tube side wall 146 may extend away from the cord 20, 22 and toward the mounting boss 54 such that the second seal tube side wall 146 protrudes past the outer seal tube surface 142 to help retain the seal 132 and inhibit axial movement of the seal 132 with respect to the seal tube 130.

The seal 132 may be disposed on the seal tube 130. The seal 132 may be made of any suitable material, such as a resilient material like an elastomeric material or rubber. The seal 132 may be overmolded onto the seal tube 130 in one or more embodiments. For example, the seal 132 may be overmolded on the seal tube 130 such that the seal 132 extends through the seal tube openings 148. As such, the seal 132 may extend inwardly from the inner seal tube surface 140 and toward a cord 20, 22 and outwardly from the outer seal tube surface 142 and toward the mounting boss 54. A portion of the seal 132 that extends inwardly from the inner seal tube surface 140 may at least partially define an inner seal surface 150 that may engage the exterior surface of a corresponding cord 20, 22. The portion of the seal 132 that extends outwardly from the outer seal tube surface 142 may at least partially define an outer seal surface 152 that may engage the interior surface 70 of the mounting boss 54. As such, the seal 132 may seal against a corresponding cord 20, 22 and the mounting boss 54 to inhibit contaminants from entering the housing 50. The inner seal surface 150 and the outer seal surface 152 may each have a wavelike or serpentine configuration in one or more embodiments.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cordset assembly comprising:
an electrical device having a housing that includes a cord opening, a mounting boss that defines a cord hole and that extends from a housing wall to a mounting boss end surface that is disposed opposite the housing wall, and first and second clamp engagement features that are disposed in the cord hole, are spaced apart from each other and the mounting boss end surface, and that each have an end surface, wherein the end surfaces of the first and second clamp engagement features are disposed opposite each other and extend toward the cord opening and cooperate with the housing wall to at least partially define a first slot;
a cap that is disposed on the mounting boss such that the mounting boss is disposed in the cap and the cap is not disposed in the cord hole;
a cord having a conductor that is received in an outer cover that defines an exterior surface of the cord, wherein the conductor and outer cover extend completely through the cord hole and the cap;
a clamp that is disposed on the outer cover of the cord and is completely received in the cord hole, wherein the clamp has a first band portion that engages the cord, a first retention portion that extends from the first band portion into the first slot, a second band portion disposed opposite the first band portion, and a second retention portion disposed opposite the first retention portion, wherein the first and second band portions extend from the first retention portion to the second retention portion; and
a seal assembly that is disposed on the outer cover and is completely disposed in the cord hole between the clamp and the cap, wherein the cap, seal assembly, and clamp cooperate to secure the cord to the housing.

2. The cordset assembly of claim 1 wherein the mounting boss has a cap retention feature that is disposed opposite the cord hole and the cap has a retention feature that engages the cap retention feature to secure the cap to the mounting boss.

3. The cordset assembly of claim 1 wherein the cap has a grommet that is disposed proximate the cord hole, wherein the cord extends through the grommet.

4. The cordset assembly of claim 3 wherein the grommet engages the seal assembly and extends continuously around the cord.

5. The cordset assembly of claim 1 wherein the clamp engages the housing and the seal assembly.

6. The cordset assembly of claim 5 wherein the clamp is spaced apart from and does not engage the mounting boss.

7. A cordset assembly comprising:
an electrical device that has a housing that includes:
a housing wall that has a cord opening;
a mounting boss that extends from the housing wall to a mounting boss end surface that is disposed opposite the housing wall, wherein the mounting boss has an interior surface and defines a cord hole that extends around an axis and the mounting boss end surface extends continuously around the axis; and
first and second clamp engagement features that are disposed in the cord hole and are spaced apart from each other and the mounting boss end surface and that each have an end surface, wherein the end surfaces of the first and second clamp engagement features are disposed opposite each other and extend from the interior surface toward the cord opening and cooperate with the housing wall to at least partially define a first slot;

a cap that receives the mounting boss;

a cord that extends along a cord axis and extends through the cord opening and the cord hole;

a clamp that is fixedly disposed on the cord and received in the first slot, wherein rotation of the cord about the cord axis is inhibited when the clamp engages at least one of the first clamp engagement feature and the second clamp engagement feature; and a seal assembly that is disposed in the cord hole between the clamp and the cap, wherein the clamp is disposed between the housing wall and the seal assembly, and the cap, seal assembly, and clamp cooperate to inhibit axial movement of the cord.

8. The cordset assembly of claim 7 wherein the first and second clamp engagement features extend from the housing wall to the seal assembly.

9. The cordset assembly of claim 7 wherein the first and second clamp engagement features extend from the mounting boss toward the cord such that the first and second clamp engagement features are spaced apart from and do not engage the cord.

10. The cordset assembly of claim 7 wherein the first slot is at least partially defined by the mounting boss and the housing wall.

11. The cordset assembly of claim 7 wherein the clamp is spaced apart from and does not engage the mounting boss.

12. The cordset assembly of claim 7 wherein the clamp has a first band portion that engages the cord and a first retention portion that extends from the first band portion into the first slot.

13. The cordset assembly of claim 12 wherein the first retention portion is spaced apart from the cord.

14. The cordset assembly of claim 12 wherein the clamp further comprises a second band portion disposed opposite the first band portion and a second retention portion disposed opposite the first retention portion, wherein the first and second band portions extend from the first retention portion to the second retention portion.

15. The cordset assembly of claim 14 wherein the first and second clamp engagement features cooperate to at least partially define a second slot that receives the second retention portion.

16. A cordset assembly comprising:

an electrical device having a housing that includes a mounting boss that at least partially defines a cord hole that extends around an axis;

a cord having a conductor that is received in an outer cover that defines an exterior surface of the cord, wherein the conductor and outer cover extend completely through the cord hole;

a clamp that is fixedly disposed on the cord and received in the cord hole;

a cap that is disposed on the mounting boss; and a seal assembly that is disposed in the cord hole between the clamp and the cap, wherein the seal assembly has a seal tube that has first and second seal tube side walls that are disposed substantially perpendicular to the axis, an inner seal tube surface that extends from the first seal tube side wall to the second seal tube side wall and that extends toward and engages the cord, an outer seal tube surface that is disposed opposite the inner seal tube surface and that extends from the first seal tube side wall to the second seal tube side wall and extends toward and engages the mounting boss, and a seal tube opening that extends from the inner seal tube surface to the outer seal tube surface, and a seal that has an inner seal surface that engages the cord and an outer seal surface disposed opposite the inner seal surface and engage the mounting boss, wherein the seal extends through the seal tube opening and receives a portion of the seal tube that extends from the first seal tube side wall to the second seal tube side wall such that the seal is spaced apart from and does not engage the clamp, wherein the first seal tube side wall engages the clamp and the second seal tube side wall engages the cap and the cap retains the seal assembly and the clamp in the cord hole.

17. The cordset assembly of claim 16 wherein the clamp has a first band portion that engages the cord and a first retention portion that extends from the first band portion.

18. The cordset assembly of claim 16 wherein the mounting boss has an exterior surface that has a cap retention feature that secures the cap to the mounting boss and an interior surface that extends around the axis and that is disposed opposite the exterior surface of the mounting boss.

19. The cordset assembly of claim 18 wherein the outer seal surface engages the interior surface.

20. The cordset assembly of claim 16 wherein the cap has a grommet that is disposed proximate the cord hole, wherein the cord extends through the grommet and the grommet engages the second seal tube side wall.

* * * * *